United States Patent
Nakanishi et al.

(10) Patent No.: US 8,802,260 B2
(45) Date of Patent: Aug. 12, 2014

(54) SEPARATION METHOD OF SECONDARY BATTERY

(75) Inventors: Toshiaki Nakanishi, Toyohashi (JP); Shuhei Marukawa, Toyohashi (JP)

(73) Assignee: Panasonic EV Energy Co., Ltd., Kosai-shi (JP)

( * ) Notice: Subject to any disclaimer, the term of this patent is extended or adjusted under 35 U.S.C. 154(b) by 599 days.

(21) Appl. No.: 12/786,216

(22) Filed: May 24, 2010

(65) Prior Publication Data

US 2010/0300601 A1 Dec. 2, 2010

(30) Foreign Application Priority Data

May 29, 2009 (JP) .................................. 2009-130004

(51) Int. Cl.
*H01M 10/48* (2006.01)
*G01N 27/416* (2006.01)

(52) U.S. Cl.
USPC .............. 429/93; 324/434; 324/426; 324/433

(58) Field of Classification Search
USPC .............. 429/90–93; 324/423, 429, 433–435; 29/730, 731
See application file for complete search history.

(56) References Cited

U.S. PATENT DOCUMENTS

| | | | |
|---|---|---|---|
| 5,800,942 A | 9/1998 | Hamada | |
| 6,392,413 B2 * | 5/2002 | Onishi et al. | ................... 324/429 |
| 6,563,318 B2 * | 5/2003 | Kawakami et al. | ........... 324/426 |
| 6,761,992 B1 | 7/2004 | Marukawa | |
| 2006/0240318 A1 | 10/2006 | Kim | |
| 2007/0212613 A1 * | 9/2007 | Ishida et al. | ................... 429/303 |

FOREIGN PATENT DOCUMENTS

| | | |
|---|---|---|
| JP | 9-120809 A | 5/1997 |
| JP | 2001-68081 A | 3/2001 |
| JP | 2001-236937 A | 8/2001 |
| JP | 2002-343324 A | 11/2002 |
| JP | 2005158643 A * | 6/2005 |
| JP | 2005-339925 A | 12/2005 |
| JP | 2006-310309 A | 11/2006 |
| JP | 2007-299544 A | 11/2007 |
| WO | WO 2008147153 A1 * | 12/2008 |

OTHER PUBLICATIONS

Machine Translation of JP 2001-068081.*
JP 2005-158643 A machine translation from JPO.*

* cited by examiner

*Primary Examiner* — Maria J Laios
*Assistant Examiner* — Robert S Carrico
(74) *Attorney, Agent, or Firm* — Christensen O'Connor Johnson Kindness PLLC (57) ABSTRACT

A method for disassembling a battery pack to separate a secondary battery which can be reused, without impairing the performance of a secondary battery, having remaining life which, constitutes the battery pack. A pair of holding plates is brought into contact with binding plates on both ends of a battery pack to compress the battery pack in the stacking direction. The open circuit voltage before and after the compression is measured, and based on an amount of change of the open circuit voltage before and after compression, a battery pack which can be reused is separated.

3 Claims, 9 Drawing Sheets

SEPARATION METHOD OF SECONDARY BATTERY

PRIORITY INFORMATION

This application claims priority to Japanese Patent Application No. 2009-130004, filed on May 29, 2009, which is incorporated herein by reference in its entirety.

BACKGROUND

1. Technical Field

The present invention relates to a method of separating a secondary battery, and more particularly to a separation method in which a battery pack is disassembled to separate a normal secondary battery for re-forming a battery pack.

2. Background Art

A battery pack formed of a plurality of plate-like battery modules stacked in the thickness direction thereof is known as one type of power supply devices with a relatively large capacity for use in electric vehicles, hybrid electric vehicles, and so on. Such a battery pack has a compact size and a light weight and is therefore advantageous in that it can be mounted within a limited space in a motor vehicle. A battery module includes a plurality of cells arranged in a line, and each cell is a hollow rectangular parallelepiped shape casing made of a thin synthetic resin or metal containing therein battery containers for housing an electrolyte and an electrode member which form the secondary battery, respectively. While such a battery module is configured such that when the internal pressure of the battery container increases to a predetermined value or greater due to generation of hydrogen gas and so on within the battery container, for example, a safety valve is actuated to release the pressure within the battery container, there is a possibility that the battery module will expand in the thickness direction due to the rise of the internal pressure. Similarly, there is a possibility of expansion of the battery module in the thickness direction due to rise in the internal pressure at the time of over-discharge reaction, over-charge reaction, reduction in the gas absorption performance at low temperatures, and so on.

JP 9-120809 A discloses a structure in which a battery pack is sandwiched by a pair of end plates and the pair of end plates are then coupled to each other on the outside the battery pack by a pair of binding bands disposed along the stacking direction of battery modules.

Further, JP 2006-310309 A discloses a structure in which a spacer is provided between unit cells for retaining the unit cells and the spacers are configured to have different shapes in accordance with the positions of adjacent unit cells, so that the required strength of the spacers is secured, to thereby prevent deformation of the unit cells.

In addition, JP 2001-68081 A discloses a structure in which in order to couple coupling members and binding plates simply and with high operability without using a special jig, a screw mechanism is provided at an end portion of the coupling member, and coupling and separation of the coupling members and the binding plates is performed by the operation of the screw mechanism.

Figure 10:
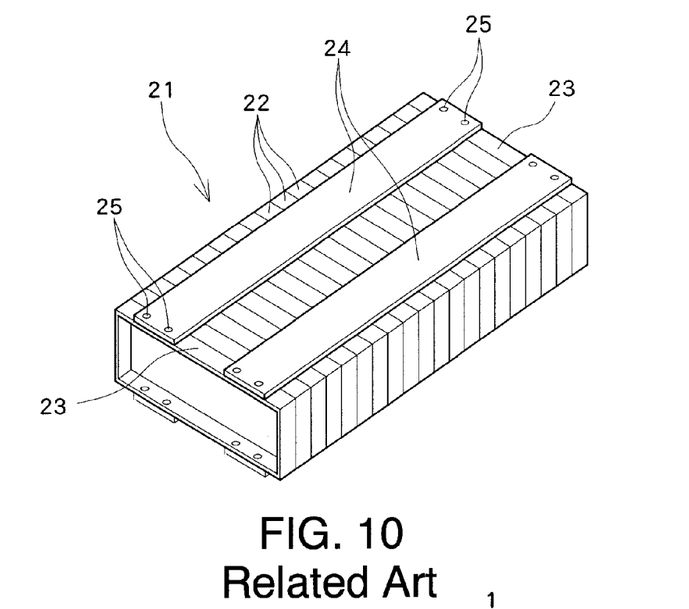
FIG. 10 is a perspective view illustrating the outer appearance of a battery pack of related art.

FIG. 10 illustrates a perspective view of an outer appearance of a battery pack of related art. A battery pack 21 includes binding plates (end plates) 23 on both ends of a stack of unit cells (battery modules) 22 in the stacking direction, the binding plates 23 being coupled together by binding bands 24 to thereby bind the unit cells (battery modules) 22 to form an integral unit. The binding band 24 is generally formed in a belt-like shape, and pairs of binding bands are disposed on a pair of opposing elongated side surfaces of the battery pack 21 at an appropriate interval such that the plate surface of the binding band 24 extends along the elongated side surface in contact therewith. The two end portions of the binding band 24 are fixed to the binding plate 23 by a rivet 25.

Figure 11:
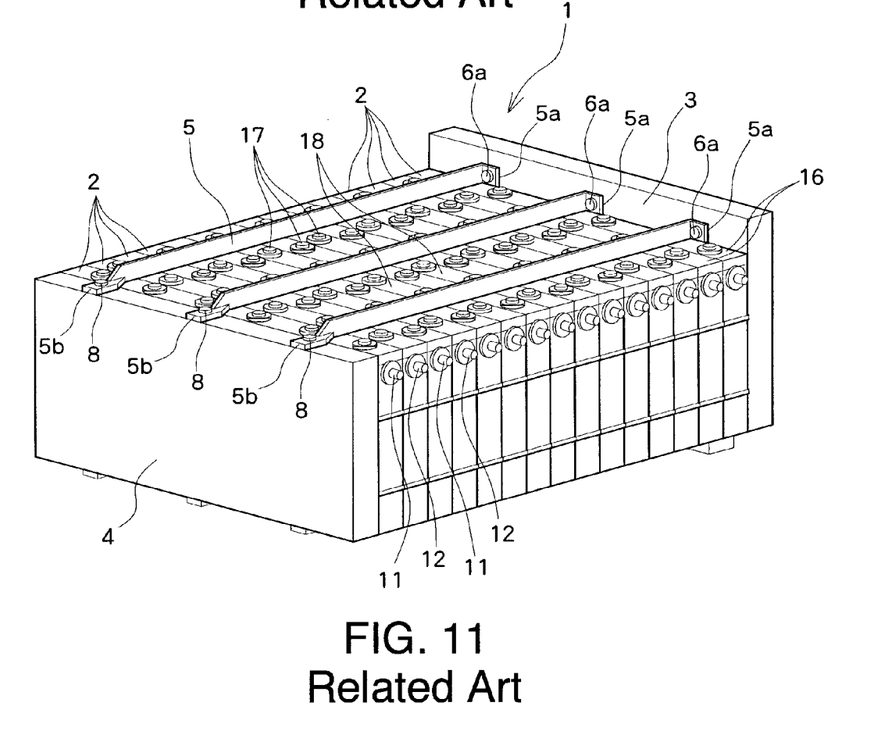
FIG. 11 is a perspective view of another battery pack of related art.

FIG. 11 illustrates a perspective view of an outer appearance of another battery pack of related art. A coupling member 5 has a rectangular cross section, and is of a plate shape such that the long side thereof is disposed vertically with respect to an elongated side surface of a battery pack 1. The coupling member 5 is configured such that a plane which is parallel to the flow direction of a cooling medium through which a cooling medium channel passes represents most of the outer surface. One end portion of the coupling member 5 is bent in an L shape with respect to the longitudinal direction of the coupling member 5 to form an L-shape attachment portion 5a which abuts against a surface of the binding plate 3 facing the unit cells (battery modules) 2, and the other end of the coupling member 5 includes an attachment plate portion 5b which extends in an L shape in the cross sectional direction of the coupling member 5 to abut against a peripheral side surface of the binding plate 4.

A fastening bolt 6 extending in the longitudinal direction of the coupling member 5 is inserted through the L shape attachment portion 5a, and a head portion 6a of the fastening bolt 6 is fixed by engagement. The fastening bolt 6 penetrates through a bolt hole formed in the binding plate 3, and a nut 7 which is threaded over this fastening bolt 6 from the tip end portion thereof is engaged with the binding plate 3 on the opposite side of the abut surface of the binding plate 3 with respect to the unit cells 2. The attachment plate portion 5b is fixed in a fastening manner to the binding plate 4 with an attachment bolt 8. Further, a positive electrode terminal and a negative electrode terminal 11 and 12 are projected at the upper end portions of both end surfaces of the unit cell (battery module) 2 in the longitudinal direction, and a safety valve 17 for releasing the pressure when the internal pressure of each unit cell (battery module) 2 is a predetermined value or greater, and a temperature detection hole 18 in which a temperature sensor for detecting the temperature of each unit cell (battery module) 2 is mounted, are formed.

When assembling the battery pack 1, the unit cells 2 are arranged in parallel and the binding plates 3 and 4 are disposed on both ends. Then, the fastening bolt 6 extending from the L shape attach portion 5a formed at one end portion of the coupling member 5 is inserted through the bolt hole formed in the binding plate 3, and the nut 7 is screwed over the fastening bolt 6 from the tip end side thereof, and the attachment plate portion 5b at the other end portion of the coupling member 5 is fastened and fixed to the binding plate 4 with the attachment bolt 8. Thereafter, the nut 7 is further screwed forward to urge the binding plate 3 against the unit cells 2 to achieve a predetermined binding state. Further, because a binding force due to an expansion caused by charging/discharging of the unit cells 2 and an increase in the internal pressure is applied to the load in the axial direction of the fastening bolt 6, with the fastening bolt having necessary strength, it is possible to assemble the coupling members 5 with a sufficient strength.

When disassembling the battery pack 1 at the time of maintenance and so on, the binding force can be released by gradually loosening the nut 7, which can eliminate the risk of damaging the binding plates 3 and 4 and the coupling members 5 as in the case of cutting the rivet.

However, conventionally, there has been no concept of disassembling the battery pack which is deteriorated in a safe manner and also reusing the secondary batteries (battery modules). While expansion of each secondary battery can be suppressed to a certain degree by sandwiching the secondary batteries with a pair of binding plates, in a case where a large number of secondary batteries are arranged, when a predetermined secondary battery expands, a pressure caused by such an expansion is absorbed dispersedly by compressive elastic deformation of other secondary batteries. The secondary batteries which have been used have different degrees of expansion and different expansion pressures within a battery pack. It is therefore important to reliably separate and effectively reuse the secondary batteries (battery modules) having remaining life, without impairing the performance of the secondary batteries.

SUMMARY

In accordance with an aspect of the invention, there is provided a separation method of a secondary battery for disassembling and separating a battery pack which is integrated by sandwiching a plurality of stacked secondary batteries by a pair of binding plates on both ends thereof and binding a whole battery pack with a coupling member coupled to the binding plates, so as to re-form a new battery pack, the method including the steps of measuring an open circuit voltage of each of the secondary batteries while retaining a bound state by means of the pair of binding plates of the battery pack; compressing the battery pack in the stacking direction to a dimension of the battery pack at the time of design, while maintaining the pair of binding plates being parallel to each other; measuring the open circuit voltage of the secondary battery in a state in which the battery pack is compressed; and separating a secondary battery which can be reused for re-forming a battery pack, based on an amount of change of the open circuit voltage of the secondary battery before and after the compression of the battery pack in the bound state.

As described above, according to the present invention, a battery pack is compressed to a dimension of the battery pack when it was designed, and based on the amount of change in the open circuit voltage before and after the compression, i.e. an amount of change between the open circuit voltage measured before the compression and the open circuit voltage measured after the compression, secondary batteries are separated. The battery pack expands in the stacking direction with elapse of time. In particular, a positive electrode plate of the secondary batteries (battery modules) forming the battery pack expands to compress a separator which electrically insulates the positive electrode plate from the negative electrode plate. The separator is degraded by deformation caused by such a compression, resulting in a high possibility of breakdown. When the battery pack is compressed to the dimension at the time of design in such a state, because, concerning the secondary battery which has been considerably degraded, the separator is broken due to this compression process to cause a short-circuit, the open-circuit voltage after the compression is largely reduced. On the other hand, concerning the secondary battery which has not been degraded very much and is therefore normal, no abnormalities are caused in the separator even during the compression process, and the open circuit voltage after the compression remains substantially the same as the open circuit voltage before the compression.

Accordingly, based on the amount of change in the open circuit voltage before and after the compression, it is possible to separate a normal secondary battery from an abnormal secondary battery in a simple manner, so that a secondary battery or the like which is reusable as a battery pack can be easily discriminated.

According to the present invention, it is possible to separate a battery pack without impairing the performance of a secondary battery having remaining life. The present invention will be clearly understood by reference to the following embodiment. It should be noted, however, that the following embodiment will be described only for illustrative purposes, and the scope of the present invention is not limited to the following embodiment.

BRIEF DESCRIPTION OF THE DRAWINGS

A preferred embodiment of the present invention will be described in detail based on the following figures, wherein.

DETAILED DESCRIPTION

A preferred embodiment of the present invention will be described in detail with reference to the accompanying drawings.

Figure 1A:
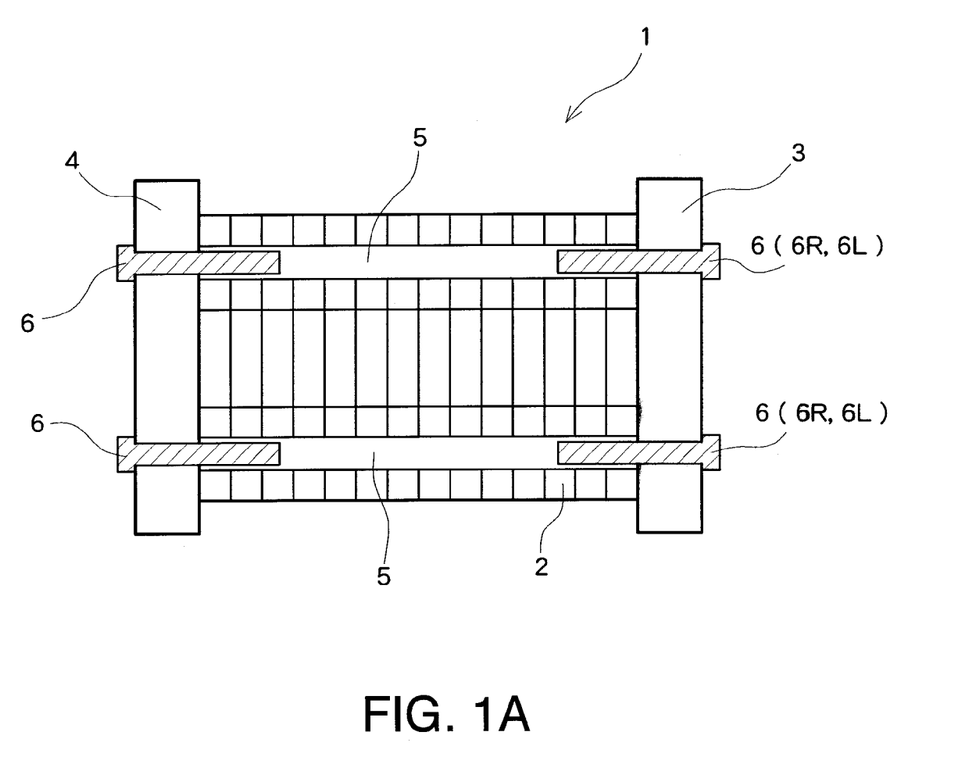
FIG. 1A is a plan view of a battery pack according to an embodiment of the present invention.
Figure 1B:
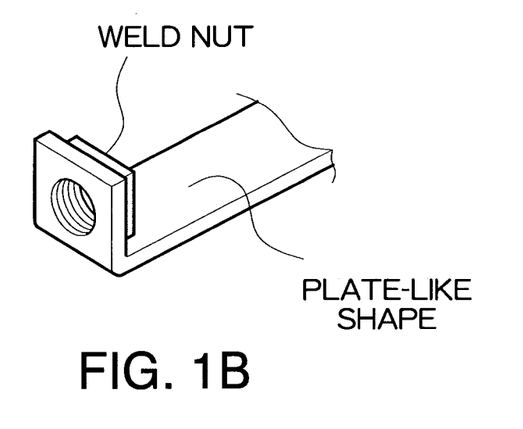
FIG. 1B is a view illustrating a configuration of a coupling member in FIG. 1A.
Figure 1C:
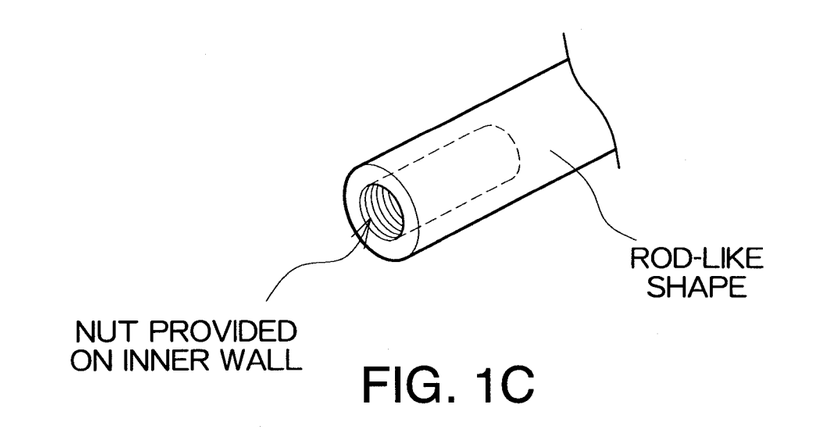
FIG. 1C is a view illustrating another configuration of the coupling member in FIG. 1A.

FIG. 1A illustrates a plan view of a battery pack according to an embodiment of the present invention. The battery pack 1 includes a pair of binding plates (end plates) 3 and 4 disposed at both ends, in the stacking direction, of a stack of prismatic battery modules (secondary batteries). each having a flat rectangular parallelepiped shape. which are stacked such that elongated side surfaces thereof are opposite to each other. The two binding plates 3 and 4 are coupled with each other by a coupling member 5 such as a binding band and so on, to bind the battery modules 2 together to form an integral unit. Each battery module 2 includes a plurality of cells arranged in a line. In the illustrated example, three cells formed of nickel-metal hydride batteries are serially connected in a line. The coupling member 5 (binding band) 5 is configured in a plate shape (FIG. 1B) or a rod shape (FIG. 1C). Pairs of the coupling members 5 are provided on a pair of opposing elongated side surfaces of the battery pack 1 (top and bottom surfaces of the sheet of FIG. 1) at appropriate intervals such that the plate surface thereof extends along the elongated side surface. The two end portions of the coupling members 5 are fixed to the binding plates 3 and 4 with a fastening bolt 6. If the coupling member 5 is in a plate shape, the coupling member 5 includes L-shape attachment portions formed at both end portions thereof. The L-shape attach portion abuts against the binding plates 3 and 4, and a fastening bolt is inserted through a bolt hole formed in the L-shape attachment plate and a nut is screwed over the fastening bolt for fastening. If the coupling member 5 is in a rod shape, the coupling member 5 includes a nut formed in an inner wall thereof at both ends. This nut-formed portion abuts against the binding plates 3 and 4, and a fastening bolt is screwed into the nut provided in the inner wall for fastening.

Figure 2:
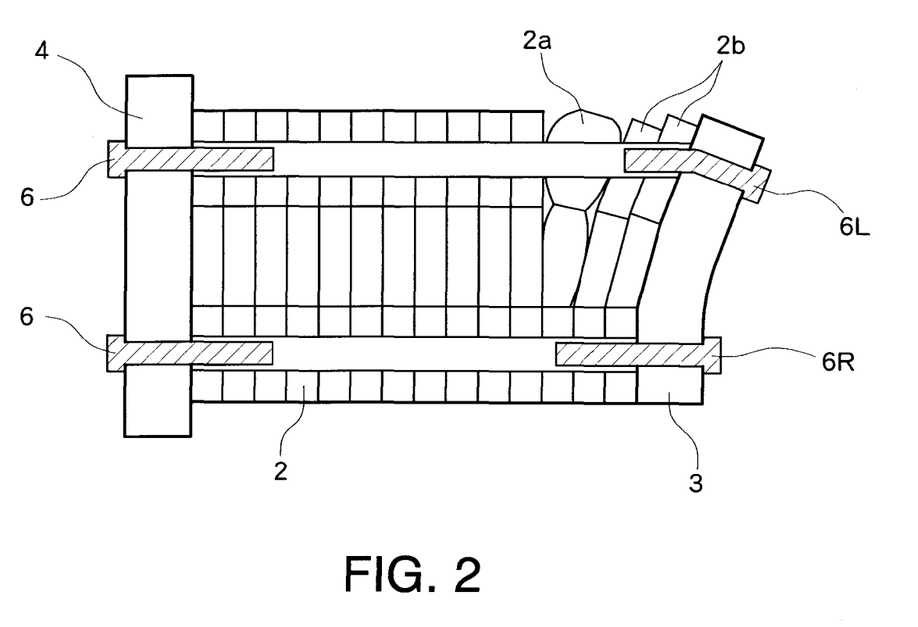
FIG. 2 is an explanatory view for explaining disassembly of the present embodiment when one of a number of fastening bolts is loosened.

When such a battery pack 1 is disassembled and reused after the battery pack 1 has been mounted and used in an electric vehicle or a hybrid vehicle, the fastening bolt 6 which fastens the coupling member 5 is released and the battery pack is then disassembled. In this case, however, if a certain battery module 2a among the plurality of battery modules 2 which are stacked is degraded and the internal pressure thereof is increased, when it is attempted to unfasten one fastening bolt 6L of a pair of fastening bolts 6R and 6L which are located on the right side in the figure so as to disassemble the battery pack 1, a state in which a battery module 2b and other battery modules are deformed and bent, due to the pressure caused by expansion of the degraded battery module 2a, may occur (one-side expansion state), as illustrated in FIG. 2. Here, although the adjacent battery module 2b has not been degraded and can therefore be reused, reuse of this battery module 2b is difficult or impossible if the battery module 2b is deformed by the pressure caused by expansion of the degraded battery module 2a, and consequently the reusability of the battery modules 2 is reduced. However, it is difficult to identify from the outer appearance, prior to disassembly, which of a plurality of battery modules 2 forming the battery pack 1 has been subjected to expansion due to degradation.

Figure 3:
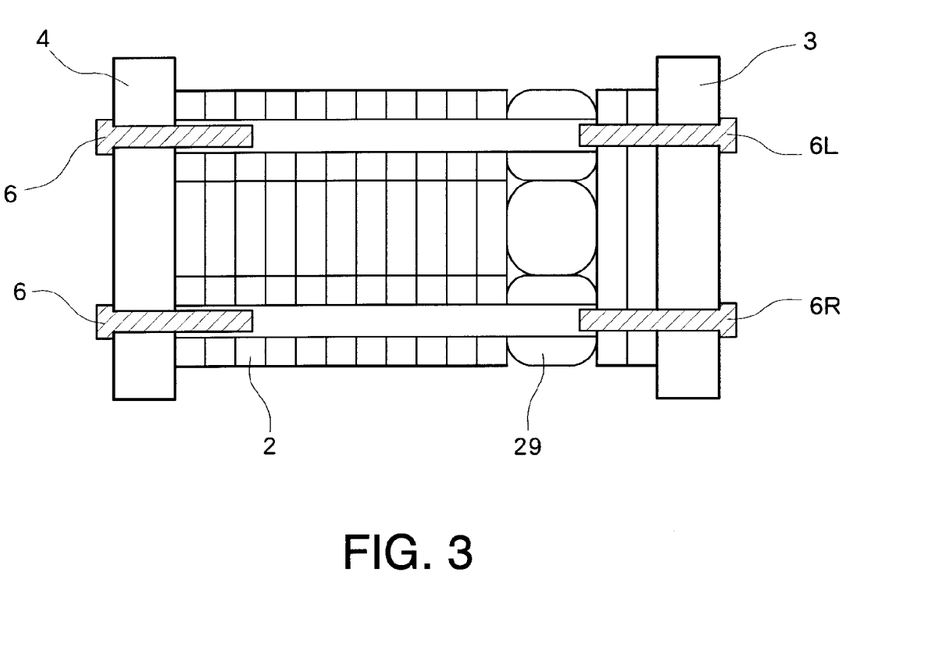
FIG. 3 is an explanatory view for explaining disassembly of the present embodiment.

In order to deal with the above disadvantage, according to the present embodiment, when disassembling the battery pack 1, the pair of fastening bolts 6R and 6L is unfastened in such a manner that the binding plates 3 and 4 at both ends of the battery pack 1 remain in a parallel state with respect to each other, as illustrated in FIG. 3. By releasing the binding force with the parallel state of the binding plates 3 and 4 being maintained as described above, even when a certain battery module 2a of the plurality of battery modules 2 is degraded and expands, the battery module 2 adjacent to the degraded battery module 2a only moves in a parallel movement without being deformed by the pressure caused by expansion, so that the adjacent battery module 2 can maintain the properties thereof. In order to maintain the pair of binding plates 3 and 4 that are parallel to each other, there is a method of unfastening the fastening bolts 6R and 6L simultaneously by an equal amount, or a method of unfastening the fastening bolts 6R and 6L while compressing the pair of binding plates 3 and 4 in the stacking direction of the battery pack 1 by using a pair of parallel jigs which are placed at a predetermined interval, and so on.

The processing at the time of disassembling and separating the battery pack 1 will be described.

First, the outer appearance of a used battery pack 1 is examined to confirm that there is no abnormality, and thereafter, the remaining capacity of the battery pack 1 is discharged. Then, the OCV (Open Circuit Voltage) of the battery pack 1 is measured. The OCV is measured for each of the battery modules 2 forming the battery pack. The open circuit voltage (which is assumed to be V1) measured for each battery module 2 is stored in a memory of a measuring device.

After the measurement of the OCV, the battery pack is attached to a disassembling jig. The disassembling jig includes a pair of mutually parallel holding plates (a positioning unit and a binding unit), and at least one of the pair of holding plates is provided such that it can be moved in parallel while remaining parallel to the other holding plate. One example of such a moving mechanism is a ball screw. The pair of holding plates is in contact with the binding plates 3 and 4 of the battery pack 1, respectively, and the battery pack 1 is compressed or released with the binding plates 3 and 4 remaining parallel to each other by the parallel displacement of the pair of holding plates. Once the battery pack 1 is attached to the jig, the battery pack 1 is compressed with the binding plates 3 and 4 remaining parallel to each other by the parallel displacement of the pair of holding plates. Because the coupling member 5 holds the battery modules 2 by compression in a state in which the coupling member 5 is elastically deformed in the length direction thereof by the expansion pressure of the battery modules 2, the battery pack 1 is compressed until the length of the coupling member 5 reaches the length at the time of design (with an error within the tolerance range being accepted). The distance between the pair of holding plates is measured by a gauge, and compression is stopped at the time point when the measured distance reaches a predetermined distance.

After the compression of the battery pack 1 with the disassembling jig, the OCV (Open Circuit Voltage) of the battery pack 1 is measured once again. The OCV is measured for each of the battery modules 2 forming the battery pack. The open circuit voltage (which is assumed to be V2) of each battery module 2 measured after the compression is stored in a memory of the measurement device. Thereafter, the fastening bolts 6R and 6L are unfastened to disassemble the battery pack 1. Here, because the battery pack 1 is compressed by the disassembling jig, each battery module 2 remains compressed even when the fastening bolts 6R and 6L are unfastened. After the fastening bolts 6R and 6L are unfastened, the pair of holding plates are displaced in parallel bit by bit to release the battery pack 1. Consequently, even when a certain battery module 2a among a plurality of battery modules 2 is expanded due to degradation, the adjacent battery module and other battery modules are only displaced in parallel and are not affected by such an expansion. The battery pack 1, after being released, is separated into individual battery modules 2, and the outer appearance of each battery module 2 is examined. Further, based on the open circuit voltage V1 before compression and the open circuit voltage V2 after compression stored in the memory of the measurement device, an amount of change $|V1-V2|$ before and after compression is calculated, and whether or not the amount of change exceeds a predetermined threshold value is determined. If the amount of change of a battery module is smaller than the predetermined threshold value, the battery module 2 is separated as being a normal battery module 2. On the other hand, if the amount of change of a battery module is equal to or greater than the predetermined threshold value, the battery module 2 is separated as being an abnormal battery module 2. A charge and discharge test is performed with respect to the normal battery modules 2 which are separated, so that the normal battery modules 2 can be reused. Here, it is also preferable for the degree of degradation of each battery module 2 as a result of the charge and discharge test to be indicated by a numeral value or by ranking, so that the battery modules 2 having the same degree of degradation can be reused.

Figure 4:
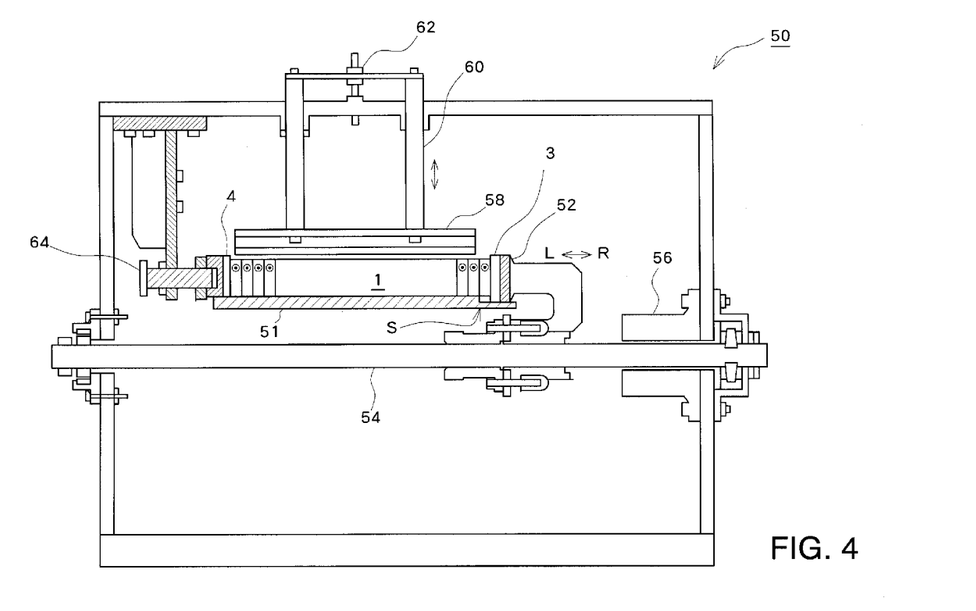
FIG. 4 is a view illustrating the structure of a jig for disassembly according to the embodiment.

FIG. 4 illustrates an example jig 50 for disassembling the battery pack 1. The jig 50 includes a table 51 on which the battery pack 1 is placed, a binding unit 52 for binding the battery pack 1, and a positioning unit 64 for positioning the battery pack 1. The binding unit 52 and the positioning unit 64 form a pair of holding plates for holding the battery pack 1. A pair of binding plates 3 and 4 are located on the right and left ends of the battery pack 1. The binding plate 4 on the left side in the figure abuts against the positioning unit 64 to determine the mount position of the battery pack 1. The binding plate 4 on the right side abuts against the binding unit 52. The binding unit 52 is fastened to a ball screw 54 by a nut. After positioning of the battery pack 1 by the positioning unit 64, the ball screw 54 is driven to rotate by a motor 56 to thereby shift the binding unit 52 in the direction of an arrow R and L in the figure. With the shift of the binding unit 52 in the L direction in the figure, the battery pack 1 is compressed. More specifically, the table 51 on which the battery pack 1 is placed has a step S formed at a predetermined position, and the binding unit 52 is moved in the direction of L in the figure until the binding plate 3 on the right side comes into contact with this step S, to thereby compress the battery pack 1 to the dimension at the time of design. Accordingly, the step S is previously formed at a position such that the distance from the positioning unit 64 to the position is equal to the dimension of the battery pack 1 in the stacking direction of the battery modules 2 at the time of design. Contact of the binding pate 3 on the right side with the step S is detected by a pressure sensor or the like. Further, a pressing plate 58 abuts against the upper portion of the battery pack 1. Specifically, a force in the vertically downward direction is applied from a cylinder 62 to the pressing plate 58 via a shaft 60, thereby pressing the battery pack 1 downward in the vertical direction.

Figure 5:
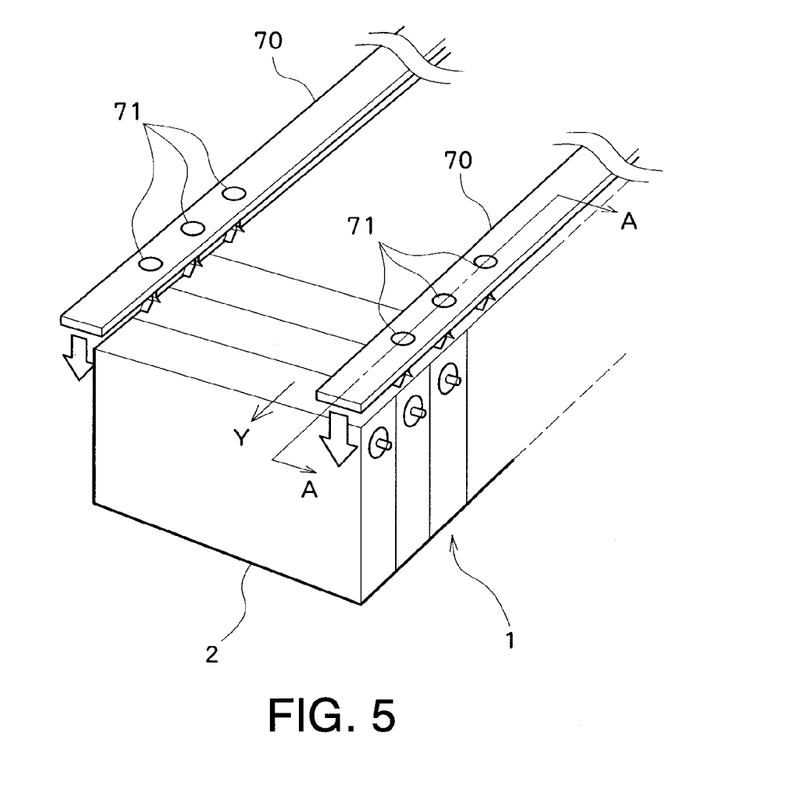
FIG. 5 is a view illustrating the structure of a jig for measuring the open circuit voltage according to the embodiment.
Figure 6:
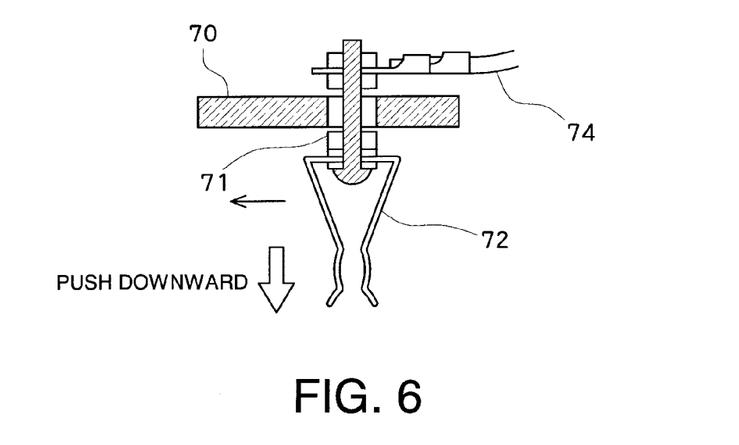
FIG. 6 is a partial cross sectional view of FIG. 5.

FIGS. 5 and 6 illustrate a jig for measuring the open circuit voltage of the battery modules 2 forming the battery pack 1. FIG. 6 is a cross sectional view taken along line A-A of FIG. 5. An open circuit voltage measuring jig 70 includes a pair of belt-like measuring plates extending in the stacking direction of the battery modules 2, and each of the pair of belt-like measuring plates includes openings 71 at positions opposing the respective battery modules 2. As illustrated in FIG. 6, a measuring terminal 72 is provided at each opening 71. The measuring terminal 72 has a cross sectional shape of an inverted triangle, the lower portion of which is formed as an open terminal portion. This terminal portion is elastically urged toward the inner side. By pushing this terminal portion downward while pressing the terminal portion onto the terminal of the battery module 2, the opening end at the lower portion of the measuring terminal 72 is wide open against the elastic force thereof to thereby sandwich the terminal of the battery module 2 and contact the terminal. The measuring terminal of one of the pair of measuring plates is connected to a positive electrode terminal of the battery module 2 and the measuring terminal of the other measuring plate is connected to a negative electrode terminal of the battery module 2. A voltage detection line 74 is connected to the measuring terminal at the opposite side of the terminal portion. The voltage detection line 74 is further connected to the measuring device. With the use of such a jig 70, the open circuit voltage of each battery module 2 before and after the compression of the battery pack 1 is measured. Here, the opening 71 is machined in the form of an elongated hole in the direction of Y in FIGS. 5 and 6, so that the measuring terminal 72 can move in the Y direction for the following reason. While the open circuit voltage for each battery module 2 is measured before and after the compression, because the dimension of the battery pack 1 in the stacking direction after the compression is reduced compared to that before the compression, the position of the terminal of the battery module 2 is also changed. In order to correspond to such a change in the position of the terminal, the opening 71 is formed in the above-described manner to allow the measuring terminal 72 to move in the Y direction.

Obviously, the jigs illustrated in FIGS. 4 to 6 are only examples, and a person with ordinary skill in the art will be able to design other structures of a jig for measuring the open circuit voltage of the battery module 2 before and after compression, as desired. It is a matter of course that the present embodiment is not limited to a specific jig structure.

Figure 7:
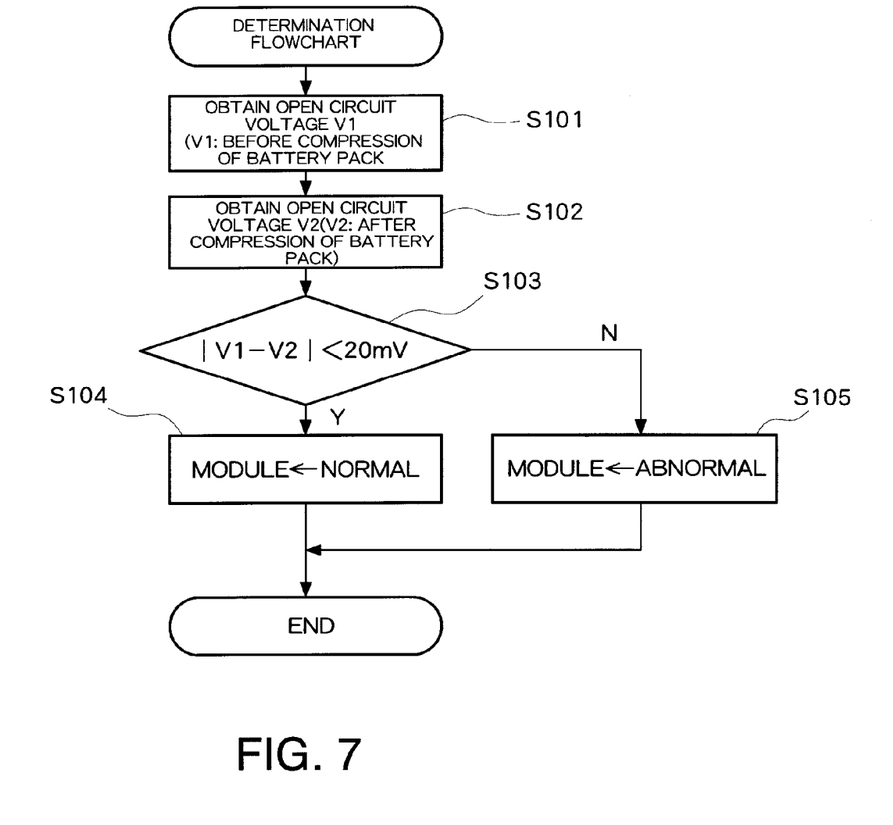
FIG. 7 is a processing flowchart according to the embodiment.

FIG. 7 illustrates a processing flowchart according to the present embodiment. More specifically, a processing flowchart for separating a normal battery module 2 from among the battery modules 2 forming the battery pack 1 is illustrated. First, after mounting the battery pack 1 on the jig 50 as illustrated in FIG. 4, the jig 70 is attached to the battery pack 1 to measure and obtain the open circuit voltage V1 of each battery module 2 (S101). The open circuit voltage which is obtained is stored in a memory for each battery module 2. Then, the battery pack 1 which expands in the stacking direction is compressed in the stacking direction to a dimension at the time of design, and the open circuit voltage V2 of each battery module 2 is measured and obtained in the compressed state of the battery pack 1 (S102). The open circuit voltage which is obtained is stored in the memory for each battery module 2. After obtaining the open circuit voltages V1 and V2 before and after compression for each battery module, an amount of change |V1-V2| of the open circuit voltages before and after compression is calculated and is compared with a predetermined threshold value, e.g. 20 mV (S103). If the amount of change of a battery module is less than the threshold value, the battery module 2 is determined to be normal (S104). On the other hand, if the amount of change of a battery module 2 is equal to or greater than the threshold value, the battery module 2 is determined to be abnormal (S105). The above determination processing is performed for all the battery modules 2 forming the battery pack 1. Consequently, it is possible to reliably separate a normal battery module 2 from among the battery modules 2 forming the battery pack 1, so that the normal battery modules can be reused for reforming a new battery pack 1.

Here, in an abnormal battery module 2, a separator for insulating the positive electrode plate from the negative electrode plate is degraded to cause dielectric breakdown, resulting in short-circuit during a compression process. Consequently, the amount of change of the open circuit voltages before and after compression of an abnormal battery module 2 is large, i.e. equal to or greater than the threshold value, whereas the amount of change of the open circuit voltages before and after compression of a normal battery module 2 is small.

Figure 8:
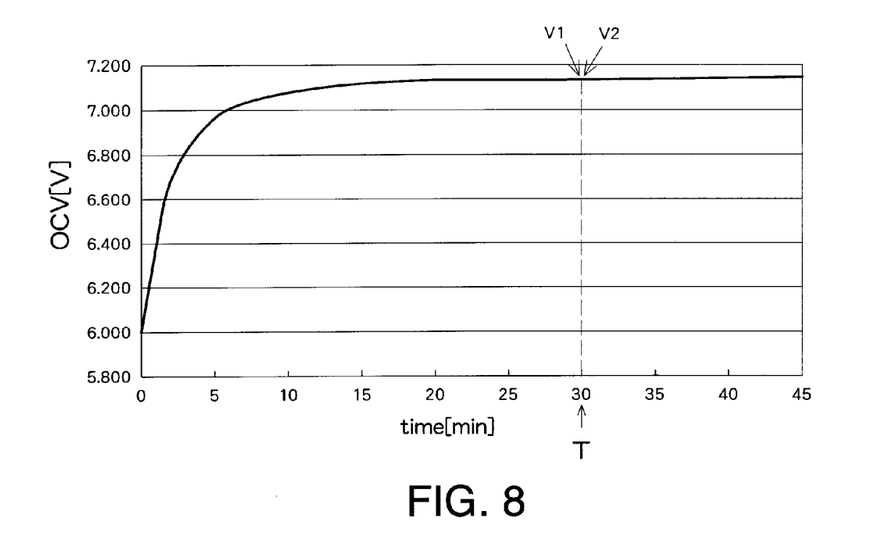
FIG. 8 is a graph illustrating the open circuit voltage before and after compression of a normal secondary battery (battery module)
Figure 9:
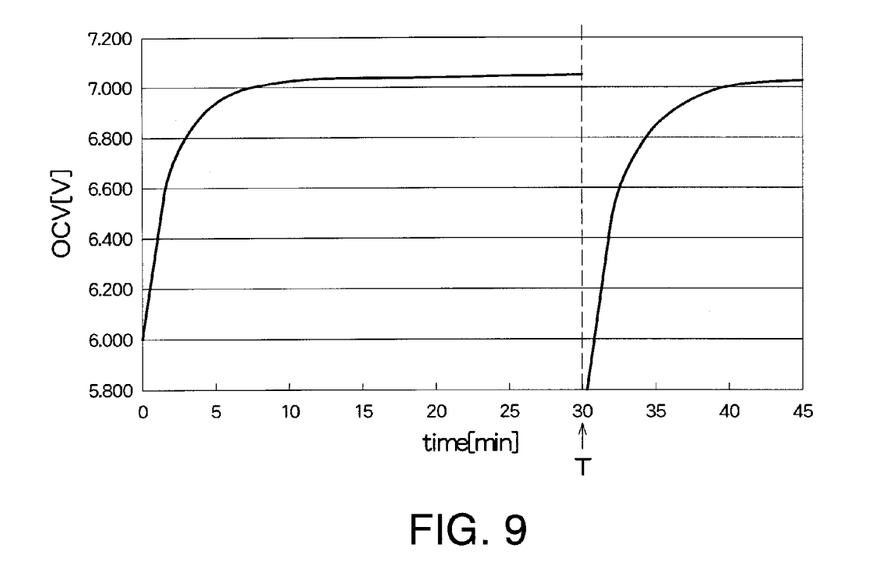
FIG. 9 is a graph illustrating the open circuit voltage before and after compression of an abnormal secondary battery (battery module)

FIGS. 8 and 9 illustrate a change of the open circuit voltage before and after compression in a battery module in which six cells constituted by a nickel-metal hydride battery are connected in series in a line. Specifically, FIG. 8 illustrates a change of the open circuit voltage in a normal battery module 2 and FIG. 9 illustrates a change of the open circuit voltage in an abnormal battery module 2. In both figures, the horizontal axis indicates time (minutes) and the vertical axis indicates the open circuit voltage OCV (V). After collecting the battery pack 1, the remaining capacity of the battery pack 1 is discharged to reduce the terminal voltage to 6.0 V. Here, the remaining capacity is discharged in order to reduce the battery internal pressure to thereby reduce the expansion pressure of the battery module 2. After discharging the battery pack 1, the open circuit voltage of the battery pack 1 gradually increases. Then, after leaving the battery pack for about 30 minutes, the open circuit voltage is stabilized.

After the open circuit voltage is stabilized as described above, the open circuit voltage V1 before compression is measured. Thereafter, the battery pack 1 is compressed at a time point T, and the open circuit voltage V2 is measured once again after compression. As illustrated in FIG. 8, because short-circuit does not occur in a normal battery module 2 even by compression, the open circuit voltage does not change before and after the compression. On other hand, as illustrated in FIG. 9, a short-circuit occurs in an abnormal battery module 2 during compression, so that the open circuit voltage V2 after compression is significantly reduced. According to the present embodiment, by attending to such a change in the open circuit voltage before and after compression, a normal battery module 2 can be separated in a simple manner.

While in the above example a case in which the coupling members 5 are coupled to the binding plates 3 and 4 with the fastening bolt 6 has been described, the present invention can be similarly applied to a case in which the binding bands 24 are fixed to the binding plates 23 with the rivets 25 as illustrated in FIG. 10. More specifically, in a state in which the battery pack 1 is compressed by a pair of holding plates (the positioning unit 64 and the binding unit 52) of the disassembling jig, the rivets are removed, and thereafter the pair of holding plates are displaced in parallel to release the binding plates 23 at both ends while maintaining the parallel state thereof.

While the preferred embodiment of the present invention has been described using specific terms, such description is for illustrative purposes only, and it is to be understood that changes and variations may be made without departing from the spirit or scope of the appended claims.

What is claimed is:

1. A separation method of a secondary battery for disassembling and separating a used battery pack which is integrated by sandwiching a plurality of stacked secondary batteries by a pair of binding plates on both ends thereof and binding the whole used battery pack with a coupling member coupled to the binding plates, so as to re-form a new battery pack, the method comprising the steps of:
providing a length dimension of an unused battery pack at a time of design of the unused battery pack;
a first measuring step, comprising measuring an open circuit voltage of each of the secondary batteries while retaining a binding state by means of the pair of binding plates coupled to each other with the coupling member of the used battery pack that is expanded in a stacking direction with the elapse of time;
after the first measuring step, a compressing step comprising compressing the used battery pack in the stacking direction to reduce a length dimension of the used battery pack to the length dimension of the unused battery pack at the time of design, while maintaining the pair of binding plates being parallel to each other;
after the compressing step, a second measuring step comprising measuring the open circuit voltage of the secondary battery in a state in which the battery pack is compressed; and
after the second measuring step, a separating step comprising separating, from the used battery back, a secondary battery which can be reused for re-forming a new battery pack, based on an amount of change of the open circuit voltage of the secondary battery before and after the compression of the used battery pack in the binding state.

2. The method according to claim 1, wherein
in the separating step, a secondary battery is separated as a normal secondary battery if the amount of change of the open circuit voltage of the secondary battery before and after compression is smaller than a predetermined threshold value, and a secondary battery is separated as an abnormal secondary battery if the amount of change of the open circuit voltage of the secondary battery before and after compression is equal to or greater than the predetermined threshold value.

3. The method according to claim 1, wherein
the step of measuring the open circuit voltage of each secondary battery before compression is executed when the open circuit voltage is stabilized after elapse of a predetermined time period after a remaining capacity of the used battery pack is discharged.

* * * * *